United States Patent [19]

Hahn et al.

[11] Patent Number: 5,293,682
[45] Date of Patent: Mar. 15, 1994

[54] APPARATUS FOR DISMANTLING POTENTIALLY CONTAMINATED TUBES FROM A TUBE BUNDLE

[75] Inventors: Robert B. Hahn, Virginia Beach, Va.; Edmund P. Dicker; Edmund R. Dicker, both of Kunkletown, Pa.

[73] Assignee: The Atlantic Group, Inc., Norfolk, Va.

[21] Appl. No.: 64,656

[22] Filed: May 21, 1993

Related U.S. Application Data

[62] Division of Ser. No. 834,814, Feb. 13, 1992.

[51] Int. Cl.⁵ ............................................. B23P 15/00
[52] U.S. Cl. ....................................... 29/727; 29/33 G; 29/723; 29/890.031
[58] Field of Search ................ 29/727, 890.031, 426.1, 29/706, 723, 33 G, 33 T, 564.1; 83/930, 862, 408, 54

[56] References Cited

U.S. PATENT DOCUMENTS

| | | | |
|---|---|---|---|
| 2,838,111 | 6/1958 | Baltus | 29/33 G |
| 4,044,444 | 8/1977 | Harris | 29/727 |
| 4,106,177 | 8/1978 | Beard et al. | 29/33 G |
| 4,815,201 | 3/1989 | Harris | 29/727 |

Primary Examiner—Irene Cuda
Attorney, Agent, or Firm—Fitzpatrick, Cella, Harper & Scinto

[57] ABSTRACT

An apparatus for deforming, splitting and chopping of contaminated, or potentially contaminated, heat exchanger tubes into short tubes segments that easily may transported to an off-site location for decontamination or disposal. The invention has particular utility in dismantling potentially contaminated tubes from a tube bundle that is part of a condenser for a BWR or PWR nuclear power plant. The invention involves first gripping and deforming the exterior periphery of a potentially contaminated tube with opposed transverse forces sufficient to travel the tube longitudinally out of the tubesheets in a deformed condition, and then splitting the deformed tube into first and second wall sections which are chopped into short length wall segments. The deformation preferably flattens the tube so that the short wall segments are substantially planar, with exposed inner and outer surfaces.

13 Claims, 3 Drawing Sheets

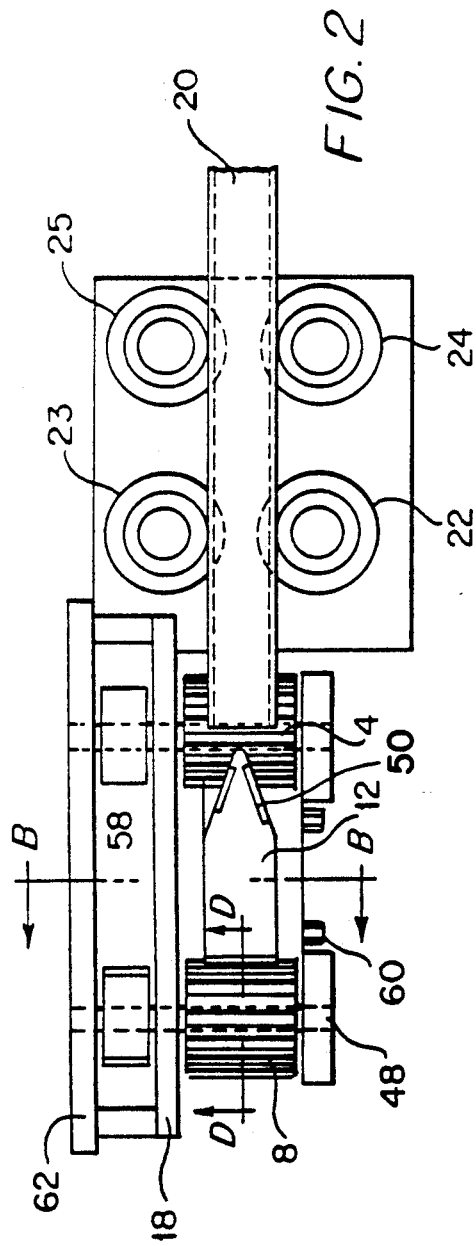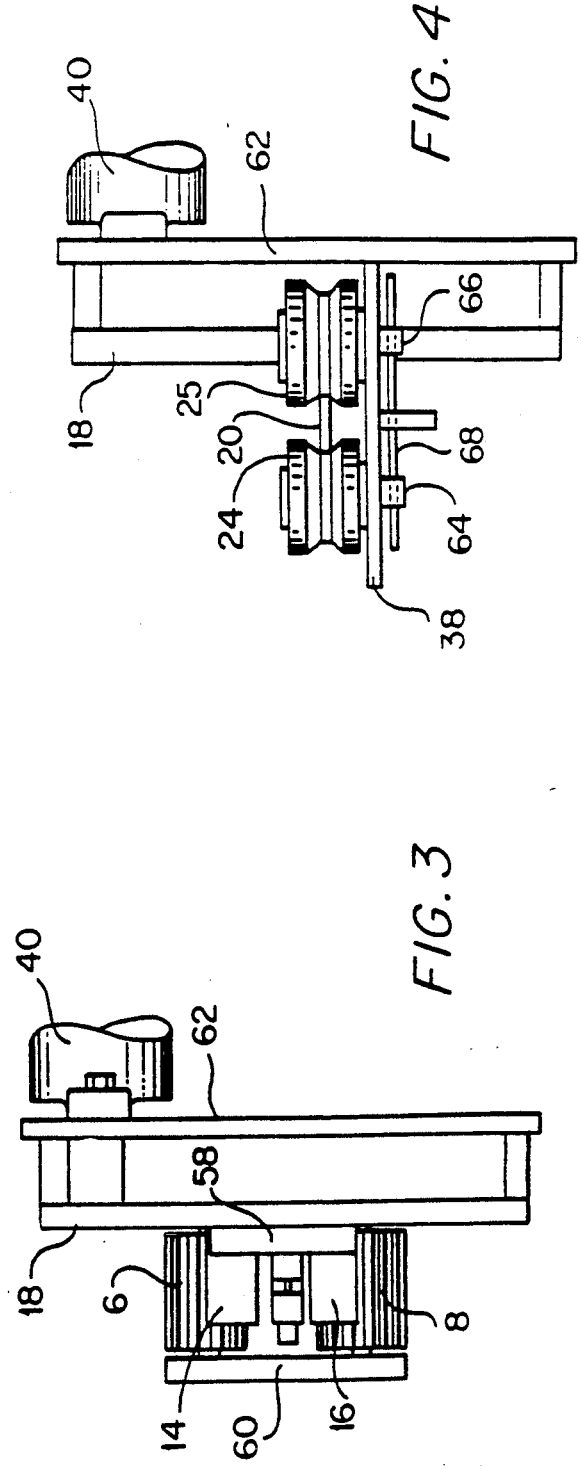

APPARATUS FOR DISMANTLING POTENTIALLY CONTAMINATED TUBES FROM A TUBE BUNDLE

This application is a division of application Ser. No. 07/834,814, filed Feb. 13, 1992.

BACKGROUND OF THE INVENTION

1. Field of Invention

A method and an apparatus for deforming, splitting and chopping of contaminated, or potentially contaminated, heat exchanger tubes into short tubes segments that easily may transported to an off-site location for decontamination, as by abrasive cleaning or other known cleaning steps. The present invention particularly is useful for condenser retubing on nuclear power plants of the boiling water reactor (BWR) type or the pressurized water reactor (PWR) type. Department of Energy regulations governing BWR and PWR reactors require that both exterior and interior surfaces of each removed condenser tube be contamination free, before the tube can be reclaimed as scrap. The present invention has utility for any heat exchanger, or the like, wherein contaminants are transported inside a tube or accumulate outside, on the tube exterior.

2. Brief Description of the Prior Art

Heat exchanger tube bundles used as steam condensers for electric power generating equipment are typically of the indirect type. A large number of parallel tubes carry a liquid, such as water, with at least one stationary tubesheet defining the tubes into a tube bundle. In order to retube, the tube collection must be exposed at one end to provide access to a large number of tube ends, which protrude from a stationary tubesheet. Each tube is tightly pressed into an opening in at least one tubesheet at each end of the collection, in order to form a fluid-tight seal. Water is circulated through the parallel set of tubes while a high temperature gas, typically steam, is circulated about the exterior of the tube bundle.

Prior to the present invention, the need to decontaminate interior wall surfaces of each tube removed from a BWR or PWR condenser tube bundle, for example, has required each tube to be be axially pulled from the tubesheets, without being deformed. Therefore, hydraulic tube extractors that grab a tube end and slowly pull out a non-deformed tube typically have been employed at such retubing sites. The prior art technique for removing such contaminated condenser tubes further includes the steps of cutting each contaminated tube into short tubular lengths at the site; packing the cut lengths into a shielded cask at the site; shipping the sealed cask to an off-site facility; and then decontaminating the exterior surfaces of the short tubular lengths by abrasive cleaning, or other cleaning methods. Each short tube length then must be inspected for any residual radiation, before scrap reclamation of that short tube length is permitted. If contamination was found on an interior surface of a short tubular length, further cleaning steps were required.

By contrast, at fossil-fueled electric power plant heat exchanger retubing sites, it has become commonplace to deform each old tube to facilitate a quick removal from the tubesheets. The deformed tubes then simply are fed into a separate device and chopped into lengths short enough for convenient shipping to a scrap dealer. Such tubes are removed by a form of "tube traveler", which comprises two or more pairs of serrated drivers, on parallel axis shafts, so as to define a passageway for axial travel of a deformed tube. The drivers are spaced apart to deformably grip the end of each tube near a tubesheet surface, and then pull, or travel, the tube axially in a deformed condition. Commonly-used tube traveler devices are represented by, et al. (U.S. Pat. No. 4,125,928), Harris et al. (U.S. Pat. No. 4,044,444) and Harris (U.S. Pat. No. 4,815,201). Another well-known type of tube traveller is the Tube Walker TM, manufactured by The Atlantic Group, Inc. of Norfolk, Va., assignee of the present invention, and used by its Condenser Services Division.

Therefore, prior to the present invention, the speed and efficiency afforded by a tube traveling step has not been available to remove tubes that potentially are internally contaminated, such as condenser tubes removed from BWR power plants with interior wall surfaces which first must be decontaminated and inspected, before being reclaimed as scrap.

The present invention permits, for the first time, an economical and efficient removal of potentially contaminated heat exchanger tubes. The present invention permits less down time due to quicker tube pulling and chopping steps; more efficient packing of tube segments into a shipping cask; and easier access to interior surfaces of tube segments.

SUMMARY OF INVENTION

The present invention comprises a method of axially removing and splitting heat exchanger tubes from a tubesheet, so as expose the inner wall surfaces of each tube. A tube traveling and deforming step axially is followed by a tube splitting step and a chopping step. A tube, which preferably previously has been deformed during a tube travelling operation, deformably is engaged and pushed axially over a horizontally disposed blade so as to be divided into substantially flat top and bottom wall sections. Each separate wall section then deformably is engaged so as to be pulled axially from the blade and then chopped into short lengths, to facilitate a packing step for off-site transport to a decontamination step.

The present invention further comprises an apparatus which accepts an axially elongated heat exchanger tube and creates short lengths of substantially flat, split wall sections of that tube in one operation. At a first station the elongated tube, preferably already flattened and separated from a tube bundle, first is deformed enough so as to be engaged and axially pushed over a blade at a second station where it is divided into sustantially planar top and bottom wall sections, with facing and fully exposed interior wall surfaces. The elongated and split tube wall sections then are guided axially to a third station, where the wall sections deformably are pressed together again. The third station pulls each axially elongated wall section away from the blade and sets up a transverse chopping operation, that creates short, split top and bottom tube wall section lengths.

The present invention preferably is performed by an apparatus having an axial arrangement essentially comprising a first pair of serrated push rollers ahead of a second set of serrated pull rollers with a splitter assembly therebetween. The driving rollers can be driven either by a common electric or hydraulic drive motor through a gear set, or by separate motors that are synchronized, so as to maintain a smooth axial travel of the elongated tube through all stations.

A previously flattened tube can be aligned with respect to a set of serrated push rollers in a first station so that a leading edge of each flattened tube will be pushed over a blade with an acute wedge angle that first opens the tube leading edge and then splits the tube into top and bottom, substantially flat wall sections. The split top and bottom tube wall sections travel around the splitter assembly of a second station and are guided together again by upper and lower guide surfaces that cooperate with exposed serrations on a set of pull rollers, of a third station.

The third station preferably has a set of pull rollers with one or more sets of removable, hardened inserts having outermost circumference diameters that together define a sustantially zero clearance, so as to chop the previously split top and bottom tube wall sections into short lengths.

Accordingly, it is a first object of the present invention to provide an improved method of removing and reclaiming heat exchanger tubes which are potentially internally contaminated, in a way that significantly reduces the overall contamination at a plant site; significantly reduces the cost of the retubing; and significantly reduces the cost to transport away tube scrap, for a possible decontamination step. This object is achieved by first removing potentially contaminated tubes from the tube bundle in a deformed condition, with a tube travelling step. Second, the deformed tubes are processed directly at the job site by a splitting step and a chopping step, which preferably both are performed in a single operation, by a single apparatus.

A second object of the present invention is to provide a tube deforming, splitting and chopping apparatus that is portable, easy to use and easily decontaminated after use at a potentially contaminated job site.

A third object of the present invention is to provide a heat exchanger tube splitting and chopping apparatus that requires only a single hydraulic motor drive and will not jam or malfunction if a chopping step does not sever both top and bottom split tube wall sections, at each opportunity.

A fourth object of the present invention to provide a heat exchanger tube splitting and chopping apparatus wherein elements subject to wear or breakage are both simple to replace and easy to adjust, for tubes of different hardness and guage.

A fifth object of the present invention is to provide a heat exchanger tube splitting and chopping apparatus for straight-line processing of previously deformed tubes, wherein a wedge action splits apart potentially contaminated inner wall surfaces about a plane of symmetry, and both the splitting and chopping steps do not generate small filings or otherwise promote airborne particles of contamination, at the job site.

Other objects and advantages of the present invention will become more apparent to those of ordinary skill in the art from consideration of the following detailed description of a preferred embodiment, wherein reference is made to the accompanying drawings.

BRIEF DESCRIPTION OF THE DRAWINGS

FIG. 2 is a top plan view, in partial section, taken along line AA of FIG. 1;

FIG. 3 is a vertical elevation side view, in partial section, taken along line BB of FIG. 2;

FIG. 4 is a vertical elevation, side view taken along line CC of FIG. 1;

DETAILED DESCRIPTION OF A PREFERRED EMBODIMENT

Figure 1:
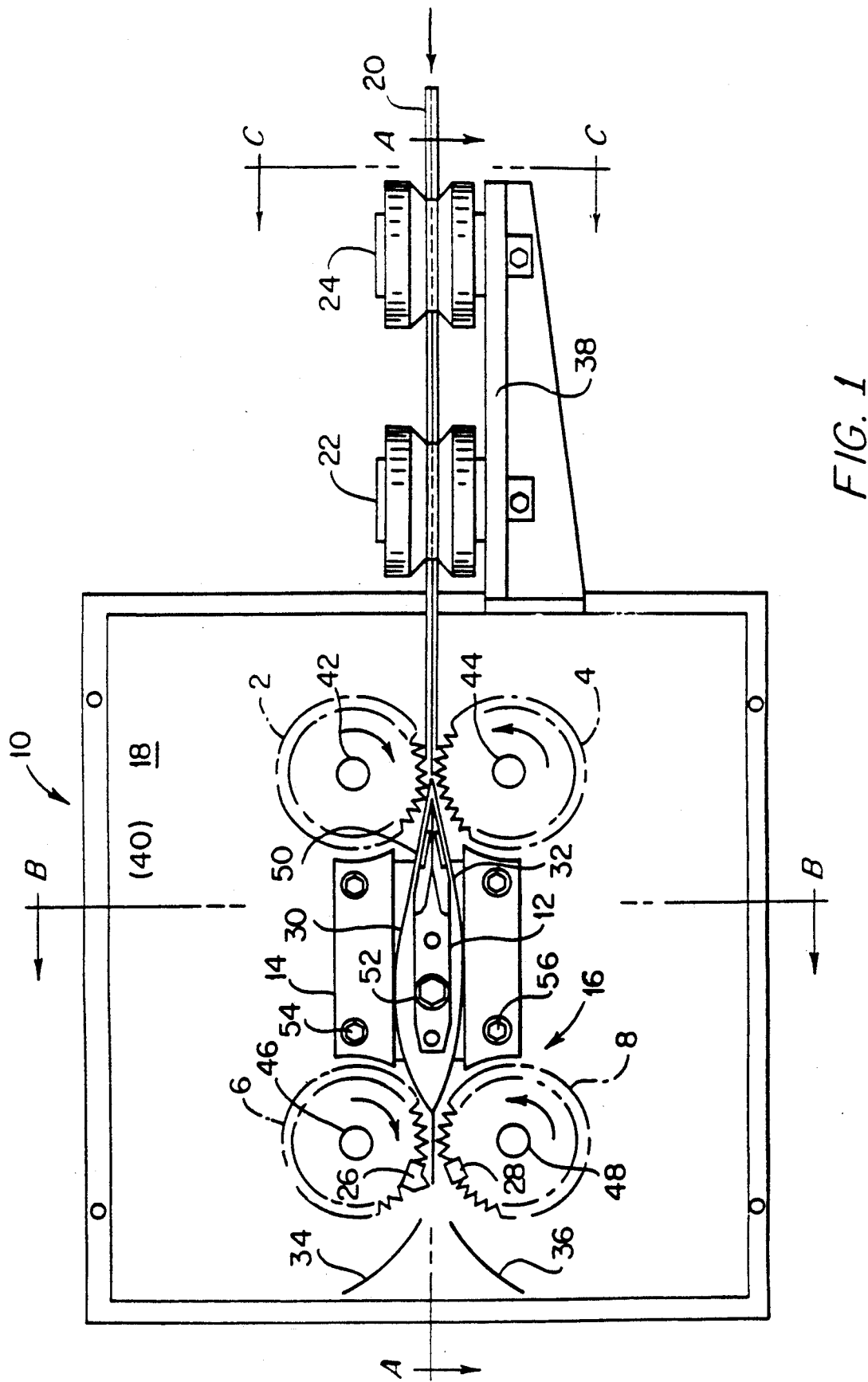
FIG. 1 is a vertical elevation front view, in partial section, of a preferred apparatus for practice of the invention, showing the sequence of operations for splitting and chopping a deformed condenser tube.

The method of the present invention essentially comprises two job site operations, in order to remove potentially contaminated heat exchanger tubes and permit a successful, off-site disposal or reclamation of the scrap metal in those tubes.

The present method has particular advantage when retubing condensers at BWR or PWR electric power plant installations, wherein the interior surfaces of the exchanger tubes may become contaminated by radiation from outer surfaces possibly covered with irradiated scale developed during contact with the "dirty steam", of a BWR plant. Department of Energy and other regulations require removed contaminated condenser tubes to have exterior and interior surfaces readily accessible for inspection and decontamination by abrasive cleaning or other cleaning methods. Decontamination services for removed BWR or PWR condenser tubes that meet Nuclear Regulatory Commission requirements conventionally are provided by companies such as SEG and Quadrex, Inc., both in Oak Ridge, Tenn. Such services generally involve hot solutions of sulfuric acid that remove phosphates and scale according to well-known techniques, such as those discussed in Knox et al. (U.S. Pat. No. 3,360,399).

Any surface film on the interior wall of a removed BWR or PWR condenser tube must be assumed as irradiated. In exposing the entire interior wall surface for a mechanical inspection and acid cleaning, any cutting act should not generate saw filings or tend to create airborne particles around the job site. BWR condenser tubes most commonly are made of stainless steel or admiralty brass. In order of decreasing hardness, condenser tubes may be stainless steel, 70/30 copper/nickel, 90/10 copper/nickel, or admiralty brass.

The most typical BWR retubing situation will present admiralty brass, stainless steel or copper nickel tube with a gauge of 18 BWG. The present invention obtains a surprising and unexpected advantage in that such work-hardened portions of the tube tend to split readily, without undue wear on the cutting blade and without generating airborne particles as consequence of the splitting, or the chopping steps. As a tube is deformed into a generally flattened state about a central plane of symmetry, into top and bottom wall sections, a work hardening takes place near to that plane of symmetry. There are a pair of transversely spaced, localized metal portions that are bent almost 180 degrees, between substantially planar top and bottom wall sections. During the tube pushing step, the serrated rollers tend to somewhat flatten the tube and add further work hardening to those tube wall regions near to the plane of symmetry. Therefore, the transverse or outermost wall portions of the flattened tube tend to become the most brittle portions of the flattened tube.

This invention takes advantages of the fact that there is work hardening proximate to the transverse plane of symmetry of the flattened tube by an elongated splitter blade with a wedge angle, and angle of attack, that tends to divide the tube into top and bottom wall sections without a significant pressure against cutting surfaces of the blade. Hence, while very hard tube materials, such as titanium and stainless steel, normally are very difficult to mechanically shear or split, the present invention takes advantage of two work-hardened regions to facilitate a splitting action, instead of a cutting action. The wedge effect tends to propagate a split that is quite reproducible and consistent, along the entire axial length of a given tube. For relatively soft and ductile materials, such as admiralty brass, the increased wear factor at the cutting edges of the splitter blade is a problem that is easily designed for. Likewise, expected wear on a hardened cutter insert, and the associated hardened radius insert, at the pull roller station may be counteracted by a brittle material feedstock, that tends to fracture easily.

According to a preferred embodiment of the present method, an elongated, deformed condenser tube is axially split into top and bottom wall sections that each are substantially planar. The top and bottom split tube wall sections then further are chopped, either simultaneously or separately, to define tube wall lengths on the order of approximately 10 inches or less. Short, substantially planar split tube wall sections particularly are useful for efficient loading of the typical shipping cask device, used to transport BWR tubes to an offsite decontamination plant. Such casks tend to be volume-constrained, since they can hold up to about 15,000 pounds of radioactive or otherwise contaminated material. The preferred method combines splitting and chopping steps into an integrated, in-line operation wherein the tube is split and then chopped in a unitary mechanical device, at a throughput speed which can approach 100 feet per minute.

A preferred apparatus for practice of the present invention comprises a splitter/chopper assembly, 10, as shown in vertical elevation view at FIG. 1. The assembly essentially comprises three stations.

The first station consists of a pair of motor-driven push rollers, wherein an upper serrated drive roller, 2, vertically is positioned above a lower serrated drive roller, 4. The first station also preferably includes a first inlet guide, 22, and a second inlet guide, 24. The leading edge of a deformed elongated condenser tube, having a transverse plane of symmetry, 20, and commonly between 30 and 60 feet in length, is positioned sustantially horizontal and hand fed into inlet guides mounted on an inlet guide support, 38, extending from a vertical side wall of the splitter assembly, 10. The inlet guide roller sets, are adjustable for maintaining the deformed tube plane of symmetry, 20, in a substantially horizontal alignment with the centerline of the elongated splitter blade, 12. The set of push rollers, 2, 4, as well as the set of pull rollers, 6, 8, preferably each have straight tooth serrations, and are driven from a common hydraulic motor through a gear set so as to rotate in opposition, at approximately 125 rpm. With such a rotation, and a nominal outer tooth diameter of 2.920 inches, a deformed or flattened tube is fed axially past the tube splitter and the splitter assembly, at a throughput of approximately 100 feet per minute.

The second station essentially comprises an elongated cutter blade, 12, and a pair of guides. An upper guide, 14 and a lower guide, 16, have inwardly facing surfaces positioned so as to guide, through sliding contact, a top split tube wall section, 30, and a bottom split tube wall section, 32. The guiding effect is calculated to urge a leading edge of each tube wall section both axially and inward, towards an engagement between serrations of the pull rollers comprising the third station.

Figure 7:
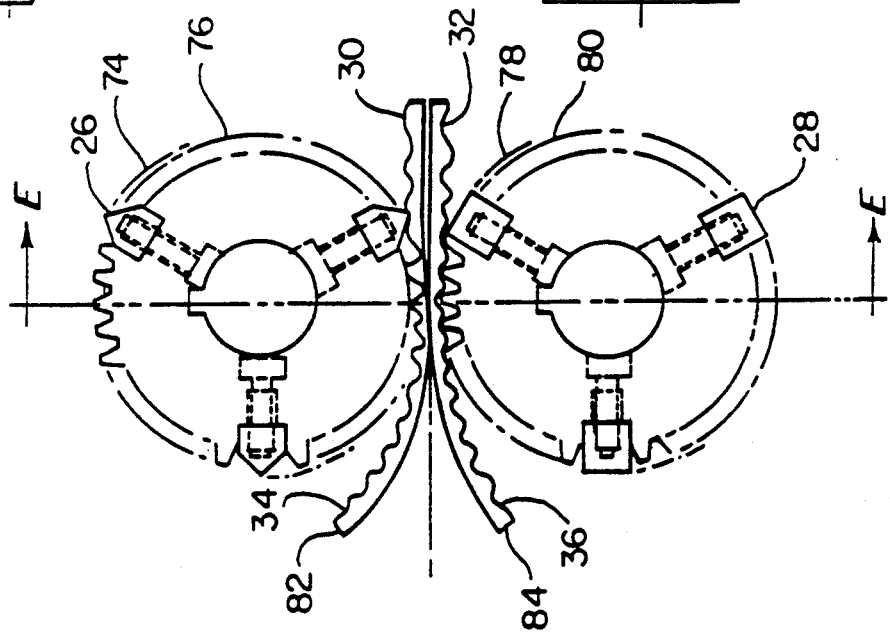
FIG. 7 is a vertical elevation, cross-section detail view of the serrated pull rollers taken along line DD of FIG. 2.

The third station essentially comprises a pair of motor-driven pull rollers, with substantially the same serration and diameter construction as used for the push rollers of the first station. In the preferred embodiment, the upper serrated drive roller, 6, has at least one hardened cutter insert, 26, and the lower serrated drive roller, 8, has at least one hardened radius insert, 28. The inserts are sized to define a periodic, guillotine cutting action against the separate top and bottom wall sections which have been axially pressed together by the adjoining roller serrations, as illustrated by FIG. 7.

As illustrated by FIGS. 1-4, the first and second sets of drive rollers may be driven from a single hydraulic motor assembly, 40, in a conventional fashion through a set of reduction gears (not illustrated) which are located between a main support plate, 18, and a back frame plate, 62. Such a drive train is analogous to that used by The Atlantic Group in the Tube Walker TM, and further details are not necessary for a full understanding of the invention. Hydraulic working pressures developed by pumps in the range of 15-25 horsepower are sufficient to drive the motor, 40.

The center line of the upper push roller shaft, 42, and the center line of the lower push roller shaft, 44, preferably are fixed apart, at 3.0 inches. The desired vertical clearance space, and compression exerted, between each pair of drive rollers then is defined by mounting different diameter drive rollers, with different numbers of teeth, pitch and pressure angles. A vertical clearance space of less than 0.08 inches has been found useful. Drive roller pairs of tool steel, hardened to Rockwell C hardness 52-55, with a nominal outer diameter of 2.920 inches, 38 teeth, 14 pitch a 25 degree pressure angle substantially will match one drive roller configuration commonly used to flatten an 18 BWG guage, stainless steel heat exchanger tube, with the Tube Walker TM. However, the local deformations on the outside of a deformed tube removed by a particular tube walking device do not have to match with those newly imposed, by the first station of the present invention. The serrated pull rollers, 6, 8, are mounted upon drive shaft centers, 46, 48, that also are 3.0 inches apart. Preferably, the nominal tooth outer diameter, tooth pitch angle and vertical clearance space for the second set of drive rollers are substantially identical to those at the first station. One or more cutter inserts, 26, and one or more radius inserts, 28, preferably are configured to provide an essentially zero vertical clearance space, when in a vertical registration. Hence, a synchronous rotation brings the outermost edge of each cutter, 26, almost into a contact with the radius surface on each corresponding insert, 28, once each revolution. The result is a clean fracture surface, 82, 84, defining each wall segment, with neither saw filings nor airborne particles tending to be created.

The pulling roller serrations first serve to pull the previously split, elongated separate top and bottom wall sections axially away from the cutter blade. Secondly, these serrations squeeze together the elongated separate top and bottom wall sections in substantially the same registration that existed, at the moment of being split apart, by the cutter blade, 12. Third, these serrations assist the shearing action of the cutter insert/radius insert combination, 26, 28, by fixing the tube sections against any localized spreading or stretching motion, as schematically shown in FIG. 7. Fourth, due to the deformations applied to the outer surface of each split, top and bottom wall section, there is a tendency for each resulting wall segment, 34, 36, to slightly curve outwardly, and be ejected by the serrations rotationally just ahead of each cutter insert/radius insert combination, as schematically illustrated in FIG. 7.

Figure 8:
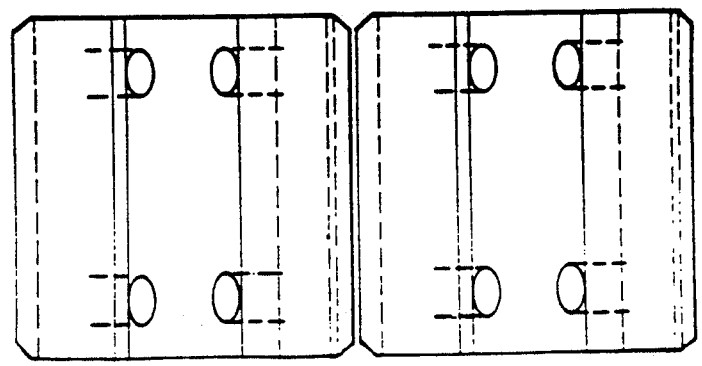
FIG. 8 is a cross-section detail view of the serrated pull rollers taken along line EE of FIG. 7.

Three cutter insert/radius insert sets are shown in FIG. 7, and a technique to removably mount the inserts with set screws is illustrated by FIGS. 7 and 8. The number of sets is a simple way of defining the desired lengths of wall section pieces, and breakage, or removal, of a set does not affect continued operation.

It can be appreciated, from considering the schematic flow of material shown in FIG. 1, that a successful chopping action (so as to define an upper wall segment, 34, and a bottom wall segment, 36) is not required for continued throughput of material. If any particular chopping action is unsuccessful, the result is simply that certain wall segments will be longer than other chopped segments. Failure of the chopping mechanism to completely separate one, or both of the split top or bottom tube wall sections being presented will not jam or slow down the operation of the machine. The pull roller serrations are capable of continuing to feed material, and clear away chopped or unchopped wall segments, as schematically illustrated in FIG. 7. This fact, together with a substantial straight line motion of the deformed tube, from inlet to outlet, enhances reliability and throughput speed.

Providing more than one set of choppers also tends to ensure that relatively short segments always will result. For a set of pull rollers, 6, 8, with a nominal 2.90 inch tooth diameter, cut wall segment lengths of approximately 9.42 inches result from one set of inserts. This length can be reduced to lengths of approximately 4.71, or 3.41, or inches simply by adding, stepwise, up to three sets of inserts. The cutter insert and the radiused insert preferably are held in place with cap screws removed from the interior, as shown in FIGS. 7 and 8, to make replacement simple in the event an insert becomes dull or fractured. Tool steel inserts, hardened to Rockwell C hardness 45, have been found effective as cutter and radius inserts, and are not overly brittle.

Figure 5:
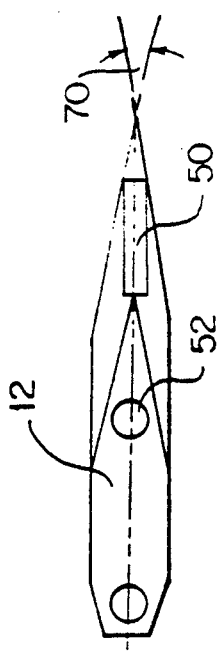
FIG. 5 is a front elevation, detail view of the cutter blade shown in FIG. 1.
Figure 6:
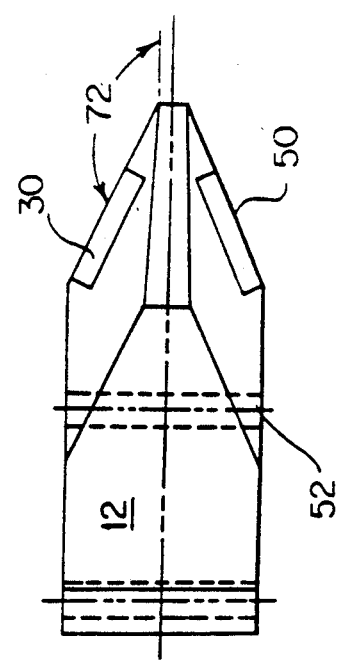
FIG. 6 is a top plan, detail view of the cutter blade shown in FIG. 1.

The elongated cutter blade, 12, preferably is made from hardened tool steel, and may have an associated coolant system (not shown). As shown in FIGS. 2, 5 and 6, tungsten carbide inserts, 50, also can be brazed to the cutting edge regions at high wear points. The acute wedge angle, 70, and the obtuse angle of attack, 72, may be changed or varied according to the expected tube material or gauge, comprising a feedstock to the device. In the preferred embodiment of the blade, the wedge angle, 70, is approximately 21 degrees and the angle of attack, 72, is approximately 150 degrees. The carbide inserts, 50, preferably are located symmetrically about the center line of the blade and are elongated to accommodate the transverse or outer edge dimensions of typical deformed heat exchanger tubes. As shown in FIG. 5, the pitch of the splitter blade can be adjusted by loosening a mounting bolt, 50. Further, guide holes and pins may be provided for exact alignment of the cutter blade, 12, with the substantially horizontal plane of symmetry, 20, being presented by each deformed heat exchanger tube.

It further should be noted that a certain amount of further work hardening may be performed on each deformed heat exchanger tube by the first set of rollers, 2, 4, using the apparatus shown in FIG. 1. It has been found that all work hardening, done only to the outside of substantially flat faces of a deformed tube, creates a tendency for the bottom and top halves of a split tube to curve outwardly and follow the radius of curvature of the respective push roller drivers, 2, 4. As shown in FIG. 1, the upward curved path of the top split tube, and the downward curved path of the bottom split tube, 32, are not the result of the wedge angle of the blade, 12. On the contrary, because of the energy imported to the outer surfaces of each split wall section, there is created a tendency for each top and bottom split tube section to curl as illustrated, and that curling assists in clearing material axially and transversely away from the cutting edge of the cutter blade. Hence, and depending upon the work hardening that has been imposed to a deformed tube and the brittleness of the tube, it has been discovered that hard materials split easier than soft materials. Hence, for certain brittle, work-hardened tube materials, the carbide inserts, 50, of the blade, may not necessarily contact the deformed tube edges, at its transverse plane symmetry. Rather, the wedging effect of the blade, as defined by the angle, 70, may be sufficient to propagate a continuous splitting of the tube. This axial splitting action takes advantage of the tendency of each tube wall section to curl outwardly, and the overall combination of structure appears to support the surprisingly fast throughputs found possible with this apparatus.

As also shown in FIG. 1, the separated top and bottom wall sections 30, 32, thereby easily are deflected by inner surfaces of an upper guide 14 and lower guide 16. The guides may be replaced or adjusted easily through a set of top guide bolts, 54, and a set of bottom guide bolts, 56, for example. Likewise, the pitch of the elongated cutter blade, 12, easily can be adjusted by a mounting bolt, 52. As shown in FIG. 2, a partial section plan view along section line AA of FIG. 1, a vertical inner guide plate, 58, preferably is positioned between the main support plate, 18, and the blade, 12. Likewise, a vertical outer guide plate, 60, also may be used to preclude off-axis travel of the deformed tube, 20.

FIGS. 2 and 4 further illustrate an inlet guide assembly comprising a first set of inlet guide rollers, 22, 23, and a second set of inlet guide rollers, 24, 25. All four guide rollers independently are adjustable, with respect to an inlet guide support, 38, by the set of adjustment blocks, 64, 66, and adjustment thread, 68, shown in FIG. 4. Between the main support plate, 18, and back frame support plate, 62, there is a conventional set of gears (not shown), so as to drive each set of drive rollers at the same rotational speed. A single hydraulic drive assembly, 40, preferably is cantilever mounted to the back frame support plate, 62. Instead of such spur gears, the respective drive shafts, 42, 44, 46, and 48, also may be driven synchronously by separate motors in a known fashion, as illustrated by Harris (U.S. Pat. No. 4,815,201).

With reference to FIGS. 2, 3, 7 and 8, the preferred cutter wheel assembly has a set of straight, transversely aligned serrations or teeth. For an outer tooth diameter, 76, of 2.92 inches, a drive roller configuration of 38 teeth, at 14 pitch with an approximate 25 degree pressure angle, has been found useful for tubes with a gauge of 18 awg. Each roller preferably is tool steel, heat treated to a Rockwell C hardness of about 50. The outer diameter, 74, at the tip of the cutter insert, 26, is shown in FIG. 7, along with the outer diameter, 78, of a corresponding radius insert, 28. As noted hereinbefore, preferably there is substantially a zero vertical clearance between the maximum pull roller diameters, 78 and 74. For 3.0 inch center line distances between both drive shafts 42 and 44, at the first station, and drive shafts 46, 48, at the third station, the two outermost diameters, 74, and 78, are just slightly less than 3 inches. The outer serration diameters, 76, 80, may range between 2.90 and 2.99 inches, depending upon the various characteristics presented by the heat exchanger tubes at a site. FIGS. 7 and 8 show how each roller may be keyed for easy removal from a drive shaft.

While a preferred embodiment of the invention has been shown and described in detail, it should be understood that various modification and changes are possible, without departing from the invention. The invention is to be defined solely by the scope of the appended claims.

We claim:

1. Apparatus for splitting a heat exchanger tube previously deformed when being traveled from a tube bundle, wherein the deformed tube comprises top and bottom wall sections about an axially extending plane of symmetry, said apparatus comprising in combination:
   a. a first station comprising first driver means for deformably engaging outer surfaces of the top and bottom wall sections and axially transfering said deformed tube to a second station;
   b. the second station comprising wedge means for splitting said deformed tube substantially about said plane of symmetry into separate top and bottom wall sections, and guide means to axially direct said wall sections to a third station,
   c. the third station comprising a second driver means to deformably engage outer surfaces of the separate top and bottom wall sections and urge said wall sections together about said plane of symmetry and pull said wall sections axially from said wedge means.

2. An apparatus according to claim 1, wherein said second driver means further comprises a cutting means for transversely chopping the separate top and bottom wall sections into shorter, substantially flat tube wall segments.

3. An apparatus according to claim 1, wherein said first driver means comprises an upper serrated drive roller and a lower serrated drive roller which are positioned above and below said plane of symmetry, so as to deformably engage the outer surfaces of the top and bottom wall sections and axially transfer said deformed tube in a substantially flattened condition to the second station.

4. An apparatus according to claim 1, wherein said wedge means further comprises a blade axially elongated and positioned transversely within said second station so as to be symmetrical with the plane of symmetry of a deformed tube that is in a substantially flattened condition, said blade further comprising an acute wedge angle about the plane of symmetry and an obtuse angle of attack in the plane of symmetry.

5. An apparatus according to claim 1, wherein said wedge means further comprises guide members spaced transversely above and below an elongated blade positioned so as to be symmetrical with the plane of symmetry of a deformed tube in a substantially flattened condition, said guide members extending substantially between said first and third stations, with inwardly facing surfaces adapted to axially guide the outer surfaces of the top and bottom wall sections and axially transfer said wall sections towards a second driver means comprising an upper pull roller and a lower pull roller which are positioned above and below said plane of symmetry.

6. An apparatus according to claim 2, wherein the second drive means at said third station further comprises an upper pull roller and a lower pull roller positioned above and below said plane of symmetry which deformably engage the outer surfaces of both said top split tube wall thickness and said bottom split tube wall thickness and urge them together about said plane of symmetry, wherein further both the upper and lower pull rollers comprise transverse serrations and the cutter means comprises a first cutter element having a cutting edge protruding outwardly from a diameter defined by said first pull roller serrations and a second cutter element having a surface protruding outwardly from a diameter defined by said second pull roller serrations, wherein said first and second pull rollers are indexed for rotation so that the cutter elements come together to define essentially a zero clearance in the plane of symmetry.

7. An apparatus according to claim 6, wherein the first cutter element comprises a wedge with a transverse cutting edge and is an insert that is removable from said first pull roller and said second cutter element has a radius outer surface and is an insert that is removable from said second pull roller.

8. An apparatus according to claim 7, wherein said pull roller serrations and said cutting wedge and radius inserts are tool steel, with a hardness of at least Rockwell C 45.

9. An improved apparatus for deforming an elongated tubular structure, splitting the deformed tube structure into elongated, split wall sections and then chopping the wall sections into short lengths, said apparatus comprising:
   a. a housing having an axial passageway leading into a first station comprising first and second drive push rollers on parallel axes and spaced about a horizontal plane of said passageway, means to rotate each push roller so as to deformably engage opposite surfaces of said tubular structure in said passageway and axially move a deformed tube to a second station;
   b. said second station comprising an axially elongated blade having an acute wedge angle spaced about said horizontal plane and an obtuse angle of attack in said horizontal plane and a cutting edge that is proximate to the outlet of said push roller, wherein said deformed tube will be split about said horizontal plane into top and bottom wall sections as the deformed tube axially enters the second station, and means to guide said split wall sections axially around said elongated blade towards a third station;
   c. said third station comprising first and second drive pull rollers on parallel axes and spaced about the horizontal plane of said passageway, means to rotate each pull roller so as to deformably engage opposite outer surfaces of said split wall sections and urge inner surfaces of said split wall sections together, and advance said split wall sections axially to a chopping means for creating substantially planar wall segments of short length;

d. wherein the means to rotate the push rollers and the means to rotate the pull rollers are synchronized, so as to define a continuous axial motion of a tubular structure inserted into said axial passageway.

10. An apparatus according to claim 9, wherein said deformed tube is in a substantially flattened condition, and said chopping means is mounted upon serrated pull rollers and further comprises at least one cutter insert on said first pull roller and at least one complementary radius surface insert on said second pull roller, whereby rotation of said first and second pull rollers will define a substantial zero clearance in the horizontal plane of symmetry of said axial passageway and thereby transversely chop each of said split top and bottom wall sections into a shorter axial length, with one chopping motion.

11. An apparatus according to claim 9, wherein said push rollers comprise a first serrated push roller and a second serrated push roller, said first and second shafts are fixed apart, and outer serration diameters of each roller define the vertical clearance space of said axial passageway.

12. An apparatus according to claim 9, wherein said deformed tube is in a substantially flattened condition, and said elongated blade further comprises substantially planar upper and lower surfaces with cutting surfaces in the region proximate to said horizontal plane being hardened for contact with work hardened edges of a deformed tube being pushed over said blade.

13. An apparatus according to claim 9, wherein said means to guide said split wall sections comprises guide members spaced transversely above and below an elongated blade positioned symmetrical with the horizontal plane of symmetry, said guide members extending substantially between said first and third stations, with inwardly facing surfaces adapted to axially guide the outer surfaces of the slit wall sections and urge inner surfaces of said split wall sections together again, at the third station.

* * * * *